United States Patent [19]

Gust

[11] Patent Number: 4,930,602

[45] Date of Patent: Jun. 5, 1990

[54] OIL DRAIN SYSTEM

[76] Inventor: Kenneth K. Gust, 6325 W. Mansfield #224, Denver, Colo. 80235

[21] Appl. No.: 332,513

[22] Filed: Apr. 3, 1989

[51] Int. Cl.$^5$ ............................................. F16N 31/00
[52] U.S. Cl. .................................... 184/106; 184/1.5; 206/223; 220/1 C
[58] Field of Search ................ 184/106, 1.5; 220/1 C; 206/223

[56] References Cited

U.S. PATENT DOCUMENTS

| | | | |
|---|---|---|---|
| Re. 32,458 | 7/1987 | DeLay, Jr. | 220/86 R |
| 3,211,256 | 10/1965 | Teutsch | 184/106 |
| 3,874,429 | 4/1975 | LaFarge | 141/98 |
| 4,054,184 | 10/1977 | Marcinko | 184/1.5 |
| 4,099,598 | 7/1978 | Clinard | 184/106 |
| 4,114,660 | 9/1978 | Arruda | 141/98 |
| 4,149,575 | 4/1979 | Fisher | 141/98 |
| 4,301,841 | 11/1981 | Sandow | 141/98 |
| 4,403,692 | 9/1983 | Pollacco | 206/223 |
| 4,524,866 | 6/1985 | Pollacco | 206/223 |
| 4,640,431 | 2/1987 | Harrison | 220/1 C |
| 4,756,411 | 7/1988 | Garland | 206/223 |
| 4,880,156 | 11/1989 | Wallet | 184/106 |

Primary Examiner—Douglas Hart
Attorney, Agent, or Firm—LaValle D. Ptak

[57] ABSTRACT

A vehicle oil drain system employs disposable one gallon plastic milk or water jugs or bottles to receive the drained oil for collection and subsequent disposition. The system includes a holder base member which is open on the top and which has side walls and end walls sufficiently high to hold a pair of side-by-side plastic jugs in position during the oil draining operation. In use, a double funnel receptacle is used to collect and distribute the draining oil into the plastic jugs. The receptacle has two spaced-apart openings in the bottom thereof; and a pair of short, downwardly extending spouts are attached to each of these openings. The spouts are inserted into the open necks of the plastic jugs before the oil draining operation, so that the necks of the jugs support the double funnel receptacle. Once the oil is drained into the plastic jugs, including oil from the oil filter which is to be replaced, the double funnel receptacle is separated from the oil-filled jugs which then are removed from the holder base member for disposal. The receptacle is stored in a nested position within the holder base member until the next time it is to be used.

20 Claims, 1 Drawing Sheet

U.S. Patent
Jun. 5, 1990
4,930,602
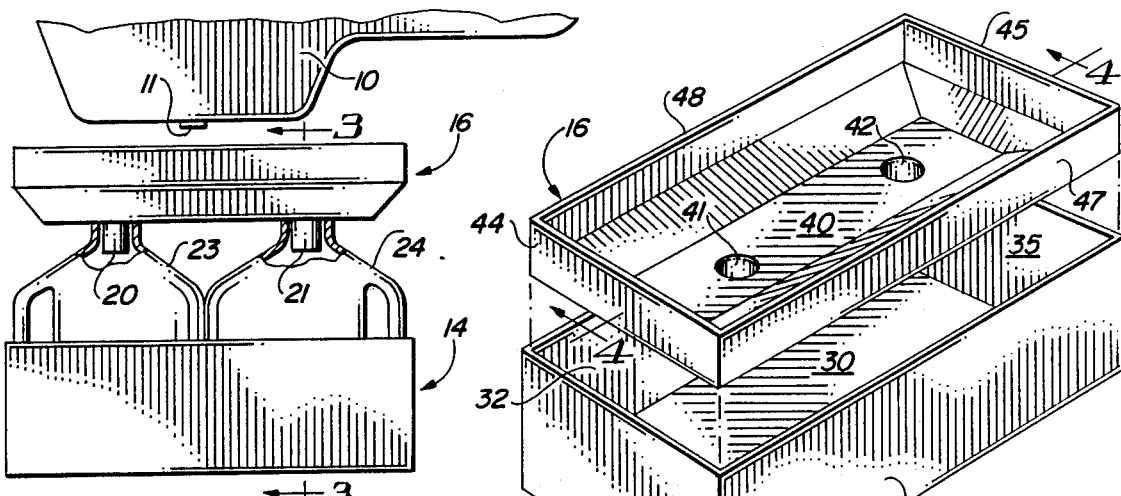
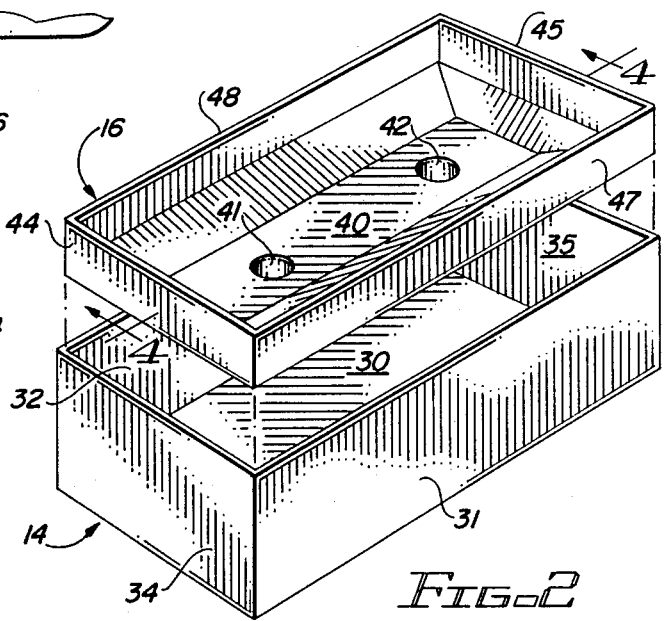
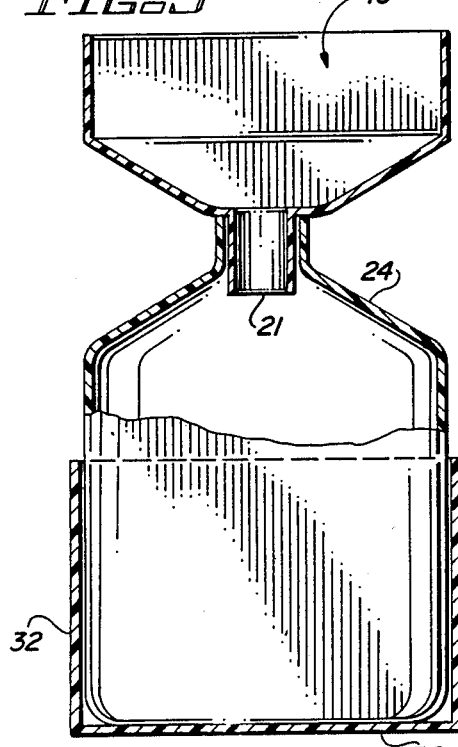
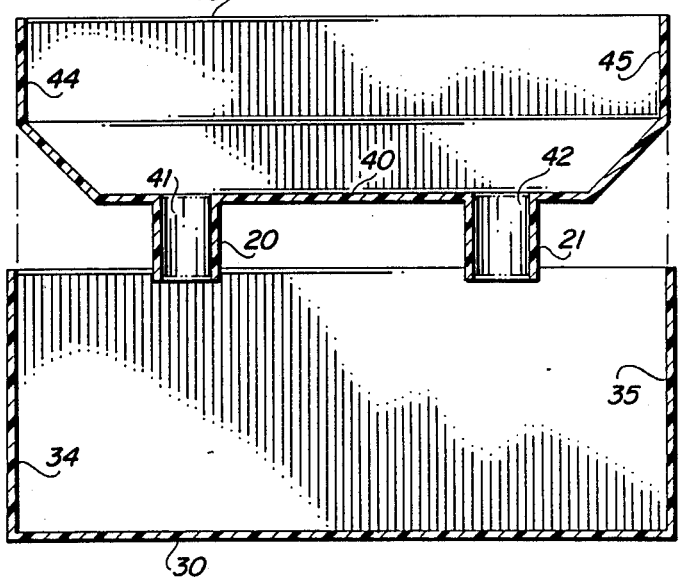
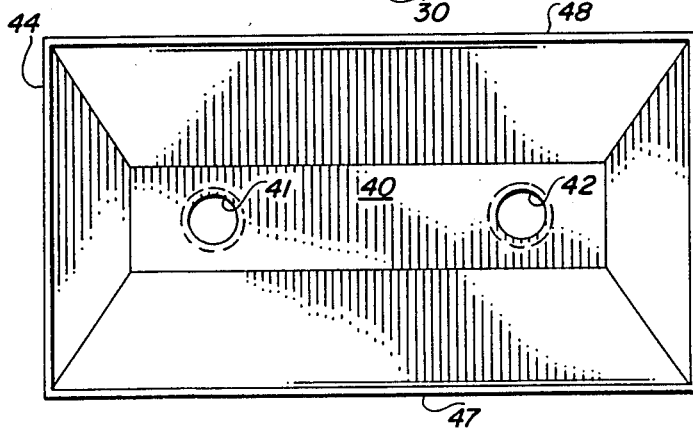
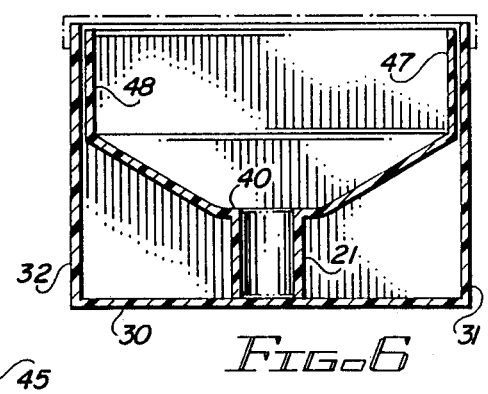
FIG.1
FIG.2
FIG.3
FIG.4
FIG.5
FIG.6

OIL DRAIN SYSTEM

BACKGROUND

Automobiles and trucks require periodic drainage of used crankcase oil, followed by replacement with fresh clean oil. Although many owners of such vehicles have this service performed by automobile dealerships or service stations, other owners choose to perform this task themselves. Typically, such do-it-yourself oil changing is a messy, dirty, and time-consuming procedure. Frequently, an open container with a capacity of two or more gallons is placed beneath the drain plug of the engine, and the oil is drained into the container. The container then is removed and the oil in it requires disposal. Frequently, such disposal is environmentally harmful, since the oil is dumped into a vacant lot or into a city sewer system, or the oil is poured into trash receptacles or waterways. Disposal in any of these various manners is unlawful in most localities and carries a high potential for hazardous waste contamination of surface water and ground water supplies.

On the other hand, used or dirty motor oil can be reclaimed and reprocessed for subsequent use. Automobile dealerships and service stations accumulate such oil and resell it to oil reclaiming centers. Do-it-yourself oil changers, however, frequently do not take the spent oil to a service station or reclaiming center. The reason for this is that switching the oil to a more easily transportable container is seldom done because it is a messy and time consuming process. Also, usually no convenient container or receptacle for accomplishing this purpose is immediately available.

Efforts have been made for facilitating the drainage, storage, and disposition of used motor oil from a motor vehicle. Two patents which disclose apparatus for facilitating do-it-yourself oil changing, are the Patents to Marcinko #4,054,184 and Clinard #4,099,598. The disclosures of these two patents are similar to one another. In the devices disclosed in both of these patents, a stand for holding a funnel receptacle is provided. The funnel has a single outlet. A resilient plastic bag is attached to the funnel to receive the oil which is drained from the engine. After the bag is filled, it is sealed, and then disposed of. The devices of both of these patents require a specially constructed plastic bag which is not commonly available for any other use. In addition, more than incidental assembly time is required and accidental spillage easily can result if the attachment between the bag and the funnel is not securely made. It is to be noted that the funnel is not supported by the bag, but requires a separate support to space it upwardly above the bag. Also, no equipment is included that can handle the used oil filter which is frequently replaced during the oil change process.

The Patent to LaFarge #3,874,429 is directed to the adaptation of standard disposable plastic milk jugs or plastic water jugs for use as a funnel system. One of the jugs must be cut in half to form the funnel. This cut apart top jug/funnel is inverted over the other jug and a special coupler attaches the two jugs together. After the bottom jug is filled through the cut apart top jug/funnel, the coupler is removed; and the bottom jug may be used to store the liquid which has been placed in it. One of the main drawbacks to the LaFarge invention is that many vehicles have a crankcase containing more oil than a standard single plastic disposable milk or water jug can hold. In such cases, one of two procedures may be employed: A. two bottom jugs, each with a separate coupler and cut apart jug/funnel could be used which would require the empty jug being slid in place of the filled jug while it is being filled, necessarily causing some drain spillage, or, B. stopping the draining procedure and replacing the drain plug, moving the filled jug and removing the coupler and cut apart jug/funnel from it and then reconnecting the coupler and cut apart jug/funnel to another empty jug and restarting the draining process again. Another drawback is that there is no equipment or procedure included to receive and drain the used oil filter.

Other devices directed to combination funnel/container devices for directing oil drained from the crankcase of an automobile or truck into the container, have been designed. These devices typically, however, must be emptied into some other container, if they are reused. If reuse is not contemplated, then these special containers must be separately purchased each time the oil is to be changed in the vehicle. Consequently, devices of this type are either inconvenient or messy to use, or they are relatively expensive. Also, few, if any, of these devices have made provision for handling of the used oil filter which is frequently replaced during the draining process.

It is desirable to provide a vehicle oil drain system and apparatus which overcomes the disadvantages of the prior art, by providing a convenient receptacle for receiving the oil and the used oil filter as the oil is drained, and which is inexpensive, clean, and easy and quick to use.

SUMMARY OF THE INVENTION

Accordingly, it is an object of this invention to provide an improved oil drain system.

It is an additional object of this invention to provide an improved, easy and quick to use oil drain system.

It is another object of this invention to provide an improved, inexpensive oil drain system and apparatus.

It is a further object of this invention to provide an improved, clean oil drain system through the use of a unique double funnel device for directing the oil drained from a vehicle crankcase simultaneously into a pair of side-by-side disposable containers.

It is also an object of this invention to include the auxiliary function of a relatively clean method of removing, draining, and disposing of a vehicle used oil filter, the replacement of which is usually recommended by most vehicle manufacturers appropriately to be accomplished along with the oil draining/changing procedure.

In accordance with a preferred embodiment of this invention, a drain system for draining and receiving spent liquids, such as used motor oil, from a motor vehicle, includes a holder base. This holder base is in the form of an open rectangular box which has a bottom, first and second opposite sides and first and second opposite ends. The box has internal dimensions which are selected to hold and support a pair of readily available bottles or containers such as empty, one gallon plastic milk jugs or water jugs. Two of these bottles are placed side-by-side in the box. A double funnel receptacle, which has a generally rectangular shape with an open top, has first and second spacedapart openings located in its bottom. First and second downwardly extending spouts are attached to the openings and are located to fit within the open necks of the bottles placed in the holder base. The bottles support the double funnel receptacle when the spouts are inserted into the open necks, allowing the bottom of the funnel receptacle to rest on the tops of the jug necks. This entire assembly then is placed beneath the drain plug or other liquid drain opening in a vehicle to permit the fluids from the vehicle to be directed through the double funnel receptacle into the bottles.

BRIEF DESCRIPTION OF THE DRAWING

FIG. 1 is a side view of a preferred embodiment of the invention, positioned for use;

FIG. 2 is a top perspective view of the embodiment shown in FIG. 1;

FIG. 3 is a cross-sectional end view taken along the line 3—3 of FIG. 1;

FIG. 4 is a cross-sectional side view taken along the line 4—4 of FIG. 2;

FIG. 5 is a top view of the invention shown in FIGS. 1 and 2; and

FIG. 6 is a cross-sectional view of the components shown in FIG. 2 in the storage position thereof.

DETAILED DESCRIPTION

Reference now should be made to the drawing in which the same reference numbers are used throughout the different figures to designate the same components. FIG. 1 is a side view of a preferred embodiment of the invention showing it in place, in use, to drain the oil from the crankcase 10 on the bottom of automobile or light truck engines through a conventional drain plug opening 11. The device of the invention comprises two primary parts. The first of these is a base 14 in the form of an open rectangular box, having a bottom 30, a pair of opposing upright side walls 31 and 32, and a pair of opposing upright end walls 34 and 35. The top of this base member box 14 is open and, as is readily apparent from an examination of the various figures, it is in the form of a rectangle.

The other primary portion of the oil drain system comprises a double funnel receptacle 16, which is designed to collect and distribute the oil which is drained through the drain plug opening 11 of the engine. The receptacle 16 has external dimensions which allow it to nest within the internal dimensions of the rectangular box forming the base member 14, as illustrated most clearly in FIG. 6. The double funnel receptacle includes a bottom 40, opposing vertical side walls 47 and 48, and opposing vertical ends walls 44 and 45. As is shown additionally in FIGS. 2, 3, 4 and 6, the bottom 40 tapers inwardly from the vertical side walls 47 and 48, and the vertical end walls 44 and 45, to surround a pair of spaced-apart openings 41 and 42, which are formed in the bottom 40.

The internal dimensions of the base member 14 are selected to hold loosely, but securely, two (2) conventional disposable plastic one-gallon milk or water bottles or jugs of the type which, filled, are commonly sold throughout the United States and other countries. These jugs are of relatively standard dimensions; so that when two of them are placed side-by-side in the base member 14, they are aligned, as illustrated in FIG. 1.

The double funnel receptacle 16 has a pair of downwardly extending spouts 20 and 21 secured to the bottom openings 41 and 42, respectively. As illustrated in FIGS. 1 and 3, these spouts 20 and 21 are constructed so as to be inserted into the open necks of the jugs 23 and 24; with the bottom 40 of the receptacle 16 coming to rest on the tops of the necks of the jugs, as shown most clearly in FIG. 3. This arrangement holds the double funnel receptacle 16 loosely but securely in place for use when all of the components are assembled, as illustrated in FIG. 1.

Ideally, the bottles or jugs 23 and 24 use screw-type caps, although jugs which employ snap-off caps also may be used. When it is desired to use the system to drain and store the oil from the crankcase of a vehicle, two (2) empty one-gallon plastic jugs 23 and 24 are placed inside the base member 14, as shown in FIG. 1. The caps of the jugs 23 and 24 should be set aside for subsequent use. Next, the double funnel receptacle 16 is placed on top of the plastic jugs, with the spouts 20 and 21 extending into the mouths or open necks of the jugs, as illustrated in FIGS. 1 and 3.

The assembly of the base 14, the jugs 20 and 21, and the double funnel receptacle 16, then is placed beneath the vehicle oil pan and is positioned; so that the oil draining through the drain plug opening 11 will strike the funnel receptacle 16 near the center of its bottom 40 between the openings 41 and 42. Draining the oil from many vehicles usually requires raising the vehicle by jack, ramps, blocks or other suitable means to allow sufficient height to accommodate the body of the person accomplishing the procedure. The oil drain apparatus is approximately thirteen inches high; and adding another several inches to allow working space between the engine drain plug and the double funnel receptacle 16 is desirable. Most jacks and ramps available at auto stores are satisfactory. However, for safety reasons, bumper jacks should not be used. Because the accident rate involving raised vehicles is high, caution should be used. After the assembly is in place, as illustrated in FIG. 1, the oil drain plug is removed from the opening 11; and it may be allowed to drop into the funnel receptacle 16 where it will remain on the bottom 40. After the oil pan 10 has been completely drained, the plug is replaced in the opening 11 in its normal position.

Most passenger vehicles and light duty trucks currently have a replaceable oil filter of less than six inches in diameter (which permits placement of a removed used oil filter in the funnel receptacle for draining), and have a crankcase oil capacity of between four and eight quarts. Consequently, two one-gallon plastic jugs 23 and 24 are ideally suited for receiving and storing all of the oil drained from the crankcase 10 in a single operation. However, with respect to the oil draining, if the ground or floor beneath the crankcase 10 is uneven, or if the assembled device is not ideally positioned beneath the crankcase drain plug opening 11, the jugs 23 and 24 may fill at a somewhat different rate. Usually, this is not a problem, since oil flows into each of the jugs 23 and 24; and the crankcase capacity is typically less than eight quarts. If, one of the jugs 23 or 24 does fill too quickly, the assembly may be moved beneath the drain plug opening 11; so that the oil flowing from the drain plug opening strikes the bottom 40 of the receptacle 16 at a point nearer the opening 41 or 42 located over the jug which is filling more slowly. A change in the rate of filling of the jugs also may be accomplished by slightly elevating the end of the base 14 which holds the jug that is filling more quickly than the other one.

After the oil is drained and the plug is replaced, the assembly may be moved to a position beneath the vehicle oil filter, which usually is located within eighteen inches of the drain plug. The used oil filter then is removed and placed in a slanted, draining position in the double funnel receptacle 16, which is of more than sufficient size to accommodate the regular size oil filter found on passenger vehicles and light trucks. In any event, once the drainage of the crankcase is completed, and the drain plug is replaced, in the opening 11, and the used filter is placed in the funnel receptacle, the entire assembly shown in FIG. 1 may be moved from beneath the vehicle.

The used oil filter, after removal from the vehicle and placement in the funnel receptacle, is drained of oil. It then may be wrapped in newspaper and discarded in any safe, suitable manner. A rag or paper toweling then may be used to wipe the residue of remaining oil from the inside surfaces and the bottom of the double funnel receptacle 16. The rag or toweling which is used to accomplish this then may be discarded in any suitable, safe manner. The funnel receptacle 16 then is removed from the top of the plastic jugs by lifting it upwardly, and then it is set aside. The caps are replaced on the openings of the oilfilled jugs 23 and 24, and they should be placed in a safe storage area for subsequent transportation to a suitable oil reclaiming center or service station for disposal.

Once the jugs 23 and 24 have been removed from the base 14, the cleaned double funnel receptacle 16 is nested inside the holder base 16, as shown in FIG. 6, for storage until the next time the system is to be used. If desired, a suitable cover (indicated in dotted lines in FIG. 6) also may be provided to close the top of the holder base member 14 and prevent dirt or other contaminants from being deposited on the inside of the double funnel receptacle 16.

The foregoing description has been directed primarily to the utilization of the system for draining the oil from a vehicle crankcase. It is readily apparent, however, that the device also may be used for draining fluids from the transmission and differential oil drains, or even from the vehicle radiator, if desired. The main procedural changes which need to be made for such uses are primarily in the position of the equipment beneath the vehicle. The manner in which the system performs is similar for any of these different uses except a filter is not normally included in these other uses.

It should be noted that the holder base member 14 and the double funnel receptacle 16 may be made of any suitable material which has the desired rigidity to perform to the functions mentioned above and which is chemically suitable to the fluids involved, such as used motor oil, with which it is primarily used. For a crankcase oil drain system, typical materials are steel, aluminum, or a variety of rigid plastics. The particular materials are not important, so long as the overall structure has the mechanical strength to perform the functions described above.

Typical dimensions of the holder base member are a six and one-fourth inch internal width by a twelve and one-fourth inch internal length. The height of the sides 31 and 32; and the ends 34 and 35 for a successfully operated commercial embodiment was four and one-half inches. For a holder base member 14 having the dimensions mentioned above, the double funnel receptacle has an external length of twelve inches and an external width of six inches. The distance from the bottom 40 to the upper edges of the ends 44 and 45; and the sides 47 and 48 is three inches, and the spouts 20 and 21 have external diameters of one inch, with a length of one and three-eighths inches. These dimensions, in part are dictated by the size of the standard, plastic jugs which are used as the used oil receptacles in the device. Those dimensions which are based on the general configurations of such jugs determine the spacings of the spouts 20 and 21, for example, and the overall internal dimensions of the holder base member 14. The external dimensions of the double funnel receptacle 16 have a secondary influencing control that necessitated by the design requirement of nesting inside the holder base 14 which therefore limits the external dimensions of the funnel receptacle to measurements slightly less than internal dimensions of the holder base 14.

The foregoing description of the preferred embodiment of the invention is to be considered illustrative and not as limiting. Various changes and modifications will occur to those skilled in the art without departing from the true scope of the invention which is defined by the appended claims.

I claim:

1. A drain system for draining spent liquids from a motor vehicle and supplying such liquids to movable receptacles, said systems including in combination:

a holder base member in the form of a generally rectangular box with a bottom, first and second upright sides, and first and second upright ends, said holder base member box having an open top for receiving at least first and second removable bottles, each having a reduced diameter open neck at the top thereof;

a double funnel receptacle means having a generally rectangular shape, with first and second spaced-apart openings located a predetermined distance apart in the bottom thereof; and first and second spouts extending a predetermined distance downwardly from said first and second openings, respectively, in said receptacle means, said first and second spouts located for insertion into the reduced diameter open necks of such first and second containers, respectively.

2. The combination according to claim 1 wherein said first and second spouts are integrally connected to said first and second openings, respectively, in the bottom of said double funnel receptacle means.

3. The combination according to claim 2 wherein the internal length and width of said holder base member is selected to be slightly greater than the external dimensions of a pair of side-by-side standard disposable plastic milk jugs.

4. The combination according to claim 3 wherein said double funnel receptacle means is in the form of a generally rectangular box with an open top, having a bottom in which said first and second spaced-apart openings are located and having first and second upright sides, and first and second upright ends.

5. The combination according to claim 4 wherein the internal dimensions of the open box comprising said holder base member are selected to accommodate and support said first and second removable bottles, and to provide stability thereto, with said double funnel receptacle means wholly supported by said first and second bottles when said first and second spouts extend into the open necks of said first and second bottles.

6. The combination according to claim 5 wherein said double funnel receptacle means has a rectangular shape with external dimensions adapted to fit within said open box holder base member when said system is not in use.

7. The combination according to claim 6 wherein said base member and said double funnel receptacle means are made of metal.

8. The combination according to claim 6 wherein said base member and said double funnel receptacle means are made of plastic.

9. The combination according to claim 1 wherein said double funnel receptacle means has a rectangular shape adapted to fit within said open box base member when said system is not in use.

10. The combination according to claim 9 wherein the internal length and width of said holder base member is selected to be substantially equal to the external dimensions of a pair of side-by-side standard disposable plastic milk jugs.

11. The combination according to claim 1 wherein said double funnel receptacle means is in the form of a generally rectangular box with an open top, having a bottom in which said first and second spaced-apart openings are located and having first and second upright sides, and first and second upright ends.

12. The combination according to claim 11 wherein the internal dimensions of the open box comprising said base member are selected to accommodate and support said first and second removable bottles, and to provide stability thereto, with said double funnel receptacle means wholly supported by the necks of said first and second bottles when said first and second spouts are inserted into the open necks of said first and second bottles.

13. The combination according to claim 1 wherein said base member and said double funnel receptacle means are made of plastic.

14. The combination according to claim 1 wherein said base member and said double funnel receptacle means are made of metal.

15. The combination according to claim 1 wherein the internal dimensions of the open box comprising said base member are selected to accommodate and support said first and second removable bottles, and to provide stability thereto, with said double funnel receptacle means wholly supported by said first and second bottles when said first and second spouts extend into the open necks of said first and second bottles.

16. The combination according to claim 15 wherein said double funnel receptacle means is in the form of a generally rectangular box with an open top, having a bottom in which said first and second spaced-apart openings are located and having first and second upright sides, and first and second upright ends.

17. The combination according to claim 1 wherein the internal length and width of said base member is selected to be slightly greater than the external dimensions of a pair of side-by-side standard disposable plastic milk jugs.

18. The combination according to claim 17 wherein said double funnel receptacle means has a rectangular shape adapted to fit within said open box base member when said system is not in use.

19. The combination according to claim 18 wherein said double funnel receptacle means is dimensioned relative to said base member such that said double funnel receptacle means nests within said base member, with said spouts resting on the bottom of said base member, when said drain system is not in use.

20. The combination according to claim 1 wherein said double funnel receptacle means has the bottom thereof sloped to direct fluids toward said first and second spaced-apart openings.

* * * * *